March 26, 1940.  A. P. DE SEVERSKY  2,194,890
SPINNER FOR AIRCRAFT
Filed April 10, 1937
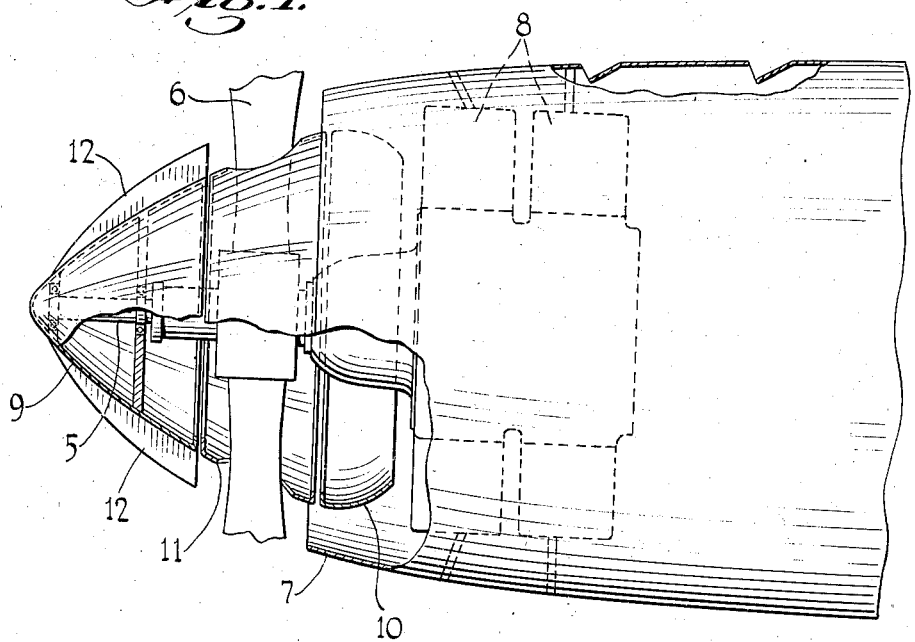
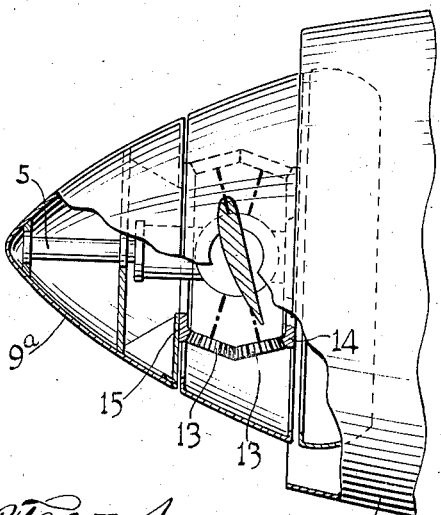
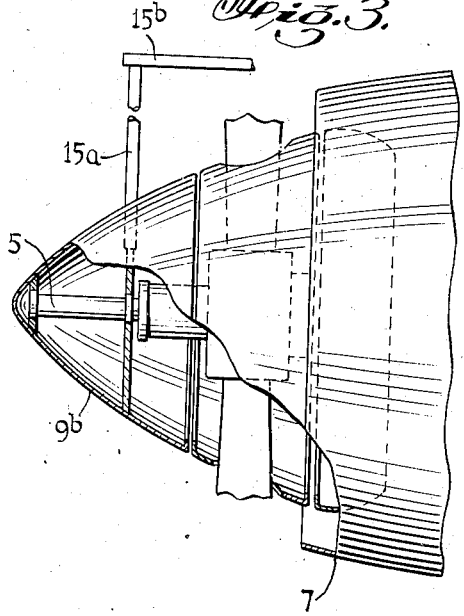
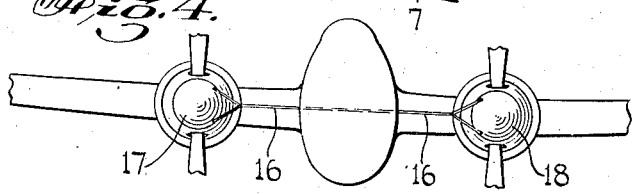
INVENTOR
ALEXANDER P. de SEVERSKY
BY
Hammond & Littell
ATTORNEYS.

UNITED STATES PATENT OFFICE 2,194,890

SPINNER FOR AIRCRAFT

Alexander P. de Seversky, Locust Valley, N. Y.

Application April 10, 1937, Serial No. 136,046

4 Claims. (Cl. 123—171)

The present invention relates to aircraft and has for an object to provide means for streamlining the flow of air along the fuselage and the flow of cooling air at the engine to reduce the head resistance acting on the aircraft and improve its general aerodynamic characteristics.

The present invention provides an improved arrangement comprising a spinner mounted in front of the propeller in such a way that it does not rotate with the propeller and a cowling and shield arrangement such that the amount of air admitted within the cowling is sufficient to cool the engine but not greater than the possible flow of air past the engine and out of the ports provided behind the engine.

This arrangement avoids a high back pressure of air with unnecessary eddying immediately in front of the engine and thereby decreases the head resistance of the craft.

The nature and objects of the invention will be better understood from a description of a particular illustrative embodiment for the purpose of which description reference should be had to the accompanying drawing forming a part hereof and in which—

Figure 1 is a longitudinal sectional view of an aircraft engine cowling with propeller and spinner embodying the invention, Fig. 2 shows another embodiment having planetary gearing for controlling the spinner, Fig. 3 shows an embodiment in which the spinner is positively fixed against rotation, and Fig. 4 is a diagrammatic view showing spinners on twin engines held against rotation by a connecting element which may serve also as an aerial.

In the illustrative embodiment of the invention shown in Fig. 1 the engine shaft 5 carries the usual propeller 6. An engine cowling 7 surrounds the engine cylinders 8 and is suitably supported on the engine. The engine shaft in accordance with the invention projects forward of the propeller and carries a streamline spinner 9 to cause a smoother flow of air through the propeller and along the fuselage and also a better flow of air within the engine cowling to cool the engine. In order to increase the smoothness of the flow of air and prevent the air from backing up in front of the engine a streamline shell 10 is provided within the cowling in front of the engine cylinders. The shape of the shell and the diameter of the cowling at its forward edge are correlated to provide an opening of the necessary size for the flow of air. The shell is of smaller diameter rearwardly in order that the annular air passage between the cowling and the shell may increase rearwardly. The shape of the shell 10 and cowling are correlated to provide as little resistance to the flow of air as possible thereby correspondingly reducing head resistance. Preferably an additional streamline shell 11 shaped to constitute a continuation of the streamline shape between the spinner and the shell 10 is secured to the propeller to rotate therewith. Annular ports are provided at the rear of the cowling and forward of the fuselage for the flow of the air out from the cowling in a manner to provide a flow along the surface of the fuselage. The cross-section of the air inlet port between the engine cowling and the streamline shell is designed with the object of admitting no more air than can flow out through the ports at the rear of the cowling. Preferably the transverse area of the inlet port is less than one-half that of the outlet ports.

The spinner 9 is preferably mounted rotatably on roller bearings on the engine shaft 5 in order that it may not be subjected to the high speed of the engine and consequent centrifugal force. The spinner may be held against rotation with the propeller in any desirable way. In Fig. 1 the spinner is shown as formed with two oppositely positioned fins 12 for this support. The fins 12 by engaging the air will sufficiently prevent rotation of the spinner or at least limit it to a speed which is not objectionable.

Fig. 2 is a diagrammatic plan view showing an arrangement for positively preventing rotation of the spinner. To this end planetary gears 13 carried with the propeller engage with each other and with ring gears 14, 15 on the engine and spinner 9a, respectively.

In Fig. 3 an arm 15a streamlined in cross-section is connected to the spinner 9b and to the Pitot tube support 15b extending forwardly from the aircraft wing.

In the case of multiple engine aeroplanes the spinners of different engines may be held against rotation by a suitable connection extending between spinners. Such connection may be in the form of a rigid bar suitably streamlined or a wire connection which may serve also as an aerial for a radio set. Such an arrangement is shown diagrammatically in Fig. 4 wherein a streamlined wire 16 passing directly through the fuselage is connected by a Y connection to the spinners 17, 18 of two engines on opposite sides of the fuselage.

The foregoing description of a particular embodiment is illustrative merely and is not intended as defining the limits of the invention.

I claim:

1. In an aircraft the combination with an engine and a propeller of streamlining devices comprising a streamlined spinner section rotatably mounted on the engine shaft forward of the propeller, means to inhibit rotation of said spinner with the shaft, a streamlined section movable with the propeller and constituting a continuation of the streamlining of the spinner section, a streamlined fixed section secured to the engine and constituting a continuation of the spinner and rotatable streamlined section and a cowling surrounding and secured to the engine and formed to provide a narrow air inlet slot between said cowling and the fixed section to admit a limited flow of air about the engine and outlets for the exit of said air, said cowling including outlets for the exit of substantially all the air entering said inlet slot.

2. In an aircraft having a body or fuselage, the combination with an engine and a propeller of a streamlined spinner mounted at the forward end of the engine shaft, means to inhibit rotation of the spinner with the engine shaft, a cowling forming a structural and aerodynamic continuation of the fuselage streamlining and completely surrounding the engine and admitting airflow from around the nose of the spinner to substantially the center of the engine, air outlets in said cowling lying between the rear edge of said cowling and the aircraft body, the diameter of the forward edge of the cowling and the diameter of said spinner being proportioned to admit a limited flow of air not greater than the possible flow from said outlets whereby back pressure of air at the front of the engine is substantially prevented.

3. In an aircraft the combination with an engine and a propeller of a streamlined spinner rotatably mounted on the engine shaft in front of the propeller and engine, means for inhibiting rotation of the spinner, a separate fixed section secured to the engine and lying entirely in front of the engine and constituting substantially a continuation of the spinner at its front end and convergent backwardly at its rear end to provide a substantially smooth flow of air to the central regions of the engine, and a cowling surrounding the engine, the cowling and fixed section being formed to provide a relatively narrow annular space which increases rearwardly from its forward portion to admit a limited flow of air about the engine.

4. In an aircraft the combination with an engine and a propeller of streamlining devices comprising a first streamlined spinner section lying in front of the propeller and inhibited from rotating therewith, a second streamlined spinner section behind the first and movable with the propeller, a third streamlined fixed section secured to the engine and constituting a rearwardly convergent continuation of the spinner and streamlined rearwardly to complete a reversed-pear shape for the three sections to thereby direct the relative wind toward the center of the engine and a cowling secured to the engine and surrounding two of said sections and formed to provide a narrow inlet slot between said cowling and the second and third sections to admit a limited flow of air into the center of, and about the engine and outlets in the body of said surrounding cowling for the exit of said air.

ALEXANDER P. DE SEVERSKY.